Aug. 26, 1941.   M. WAGNER   2,253,666
SUSPENSION FOR INDEPENDENTLY GUIDED WHEELS ON THE
CHASSIS ESPECIALLY OF MOTOR VEHICLES
Filed May 10, 1938
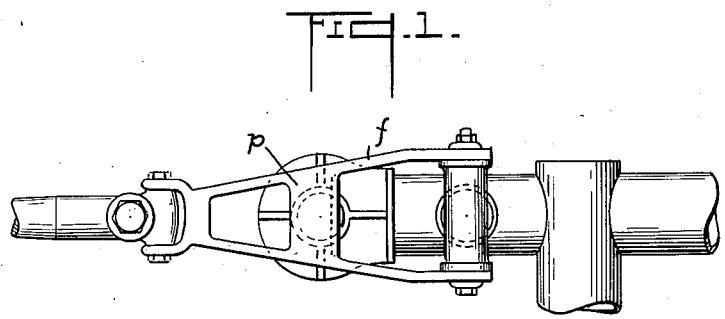
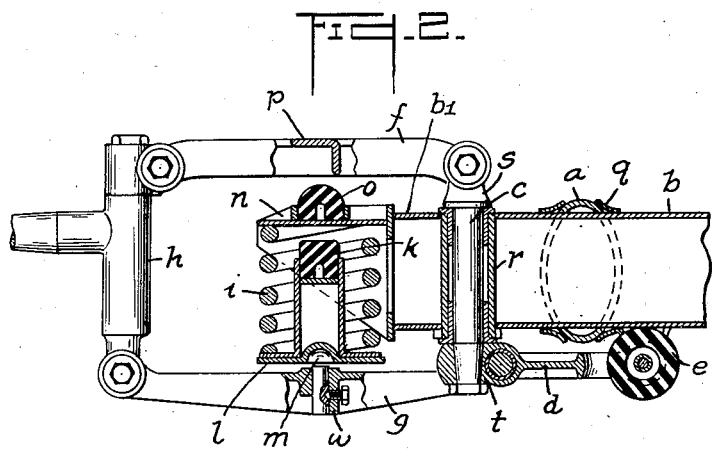
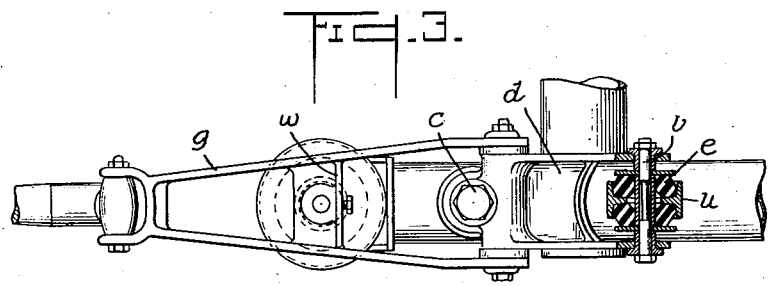
MAX WAGNER
INVENTOR
BY
his ATTORNEY.

Patented Aug. 26, 1941

2,253,666

UNITED STATES PATENT OFFICE 2,253,666

SUSPENSION FOR INDEPENDENTLY GUIDED WHEELS ON THE CHASSIS ESPECIALLY OF MOTOR VEHICLES

Max Wagner, Stuttgart, Germany, assignor to Daimler-Benz Aktiengesellschaft, Stuttgart-Unterturkheim, Germany Application May 10, 1938, Serial No. 206,968
In Germany May 10, 1937

18 Claims. (Cl. 280—106.5)

The invention relates to a suspension for wheels on the chassis especially of motor vehicles said wheels being independently guided by means of a four-sided link system and the invention consists substantially in that a chassis cross-member is extended beyond the longitudinal member to which it is rigidly connected and that one of the links of the system is arranged above and another is arranged below the cross member on the end of the same projecting beyond the longitudinal member, whereas a spring, preferably a helical spring or the like serving for resiliently supporting the wheel bears against the cross-member, preferably against an abutment arranged between the links and fixed at least on the cross-member, preferably on the extreme end of the cross-member. Between the links and the cross-member stops are provided, preferably with spring action, e. g. of rubber for limiting the vertical displacement of the wheel in both directions, especially by utilizing the upper spring abutment for this purpose. The cross-member is preferably tubular and extends through the longitudinal member which is also tubular and preferably of oval cross-section, and the two members are rigidly connected at the two crossing points (for example by welding and if necessary by additional edge reinforcements). The invention also provides preferably for an arrangement, in which the two links are mounted on an intermediate member which extends through the tubular cross-member and is rigidly or yieldably connected therewith.

The primary object of the invention is, to provide a wheel suspension which, while occupying as little space as possible, nevertheless imparts great stiffness to the chassis so that the particularly great forces occurring in the case of independent suspension do not stress the chassis beyond the permissible limit. The chassis may be kept relatively narrow with the result that space and weight are saved. The wheel suspension and spring supporting are in alignment with the cross-member of the chassis, so that lateral bending moments on the cross-members are avoided.

The invention also relates to an arrangement of the bearing- and supporting-members for the guide links and the spring supporting of the wheel, which is advantageous as regards the transmission of forces on to the chassis, and also to a practical constructional arrangement of these members in the chassis construction.

An embodiment of the invention is illustrated by way of example in the accompanying drawing in which—

Fig. 1 shows a wheel suspension according to the invention, partly in elevation and partly in section, Fig. 2 is a top plan view and Fig. 3 a bottom plan view partly in section.

The longitudinal members $a$ of the chassis are tubular and of oval cross-section. A tubular cross-member $b$ extends through apertures in the wall of the longitudinal members and is welded therewith on both sides so that the longitudinal and cross-members form a rigid system. For obtaining greater stiffness additional corner stiffenings $q$ may be provided which are welded with the longitudinal and cross-members.

A vertical stiffening tube $r$ is inserted in the end $b_1$ of the cross member projecting beyond the longitudinal member $a$ and in this tube a vertical pivot pin $c$ is mounted. This pivot pin has at its upper end a cross piece $s$ for carrying the upper guide link $f$ and at its lower end a cross piece $t$ for carrying the lower guide link $g$ of the wheel. The cross piece $t$ carries a bifurcated lever $d$ the arms of which bear against the opposite ends of a rubber buffer $e$ inserted in an eye $u$ on the chassis cross member and held under preliminary tension by a bolt $v$. The pivot pin $c$ and the pads $e$ preferably of rubber serving for elastically supporting the pivot pin against rotation about its axis are, as can be seen, arranged on different sides of the longitudinal member $a$ so that the stresses are partly compensated as regards the longitudinal member.

Each of the guide links $f$ and $g$ for guiding the wheel carrier $h$ is bifurcated and provided with a transverse arm $p$ or $w$. In the transverse arm $w$ of the lower link a preferably adjustable ball-headed pin $m$ is inserted on which a spring abutment $l$ for the helical spring $i$ rests. Thereby the spring is adjustable. This could also be achieved by other suitable means, e. g. providing an adjustable abutment. This spring extends vertically in front of the end face of the cross-member $b$. As upper support for the spring a spring abutment $n$ is provided which is arranged at about the height of the cross-member wall at the extreme end of the cross-member and is for example welded thereto. The abutment $n$ is stiffened by lateral walls or stays so that the spring $i$ is partly surrounded thereby as in a casing. A rubber buffer $k$ serves for limting the upward displacement and a rubber buffer $o$ for limiting the downward displacement of the wheel.

The links may be mounted in bearings rigidly connected with the cross-member instead of on a pivot pin c mounted yieldably in the direction of rotation. Furthermore instead of employing a helical spring i, some other similarly constructed spring (for example a rubber spring, a so-called ring spring or the like) may be provided which can be arranged in a manner corresponding to that of the helical spring.

Having now particularly described and ascertained the nature of my said invention and in what manner the same is to be performed, I declare that what I claim is:

1. In a wheeled vehicle, a chassis comprising a longitudinal member, a transverse member intersecting said longitudinal member in substantially the same plane and projecting outwardly beyond the latter, a wheel carrier, an upper horizontal bearing mounted on the upper side of said transverse member between said intersection and the outer end of said transverse member, an upper guide link pivoted in said upper bearing and connecting the same with said wheel carrier, a lower horizontal bearing mounted on the lower side of said transverse member between said intersection and the outer end of said transverse member, a lower guide link pivoted in said lower bearing and connecting the same with said wheel carrier, said wheel carrier forming with said upper and lower guide links a guide link parallelogram permitting up and down movements of the wheel carrier relative to the chassis, an upper spring block rigidly secured to the outer end of said transverse member, a lower spring block carried by the lower guide link, and a substantially vertical spring disposed between and supported against said two spring blocks.

2. In a wheeled vehicle, a combination, as claimed in claim 1, in which said transverse member is formed as a tubular element and said upper spring block comprises a flange fitting the tubular end of the transverse member and being rigidly secured thereto.

3. In a wheeled vehicle, a combination, as claimed in claim 1, in which said vertical spring is a helical spring extending freely between said two spring blocks.

4. In a wheeled vehicle, a combination, as claimed in claim 1, comprising a bearing element passing vertically through said transverse member outwardly of said intersection, said upper and lower horizontal bearings being secured to the corresponding ends of said bearing element, means supporting said bearing element in said transverse member for pivotal movements relative to the chassis about a vertical axis, and means to resiliently oppose pivotal movements of said bearing element about said vertical axis.

5. In a wheeled vehicle, a combination, as claimed in claim 1, comprising a bearing element passing vertically through said transverse member outwardly of said intersection, said upper and lower horizontal bearings being secured to the corresponding ends of said bearing element, means supporting said bearing element in said transverse member for pivotal movements relative to the chassis about a vertical axis, buffer means mounted on said transverse member inwardly of said intersection, and means rigid with said bearing element and adapted to cooperate with said buffer means so as to oppose pivotal movements of said bearing element about its vertical axis.

6. In a wheeled vehicle, a chassis comprising a longitudinal member, a transverse member intersecting said longitudinal member and projecting outwardly beyond the latter, a wheel carrier, a bearing element passing vertically through said transverse member outwardly of said intersection at a point short of the outer end of said member and being supported therein for pivotal movements about a vertical axis, means resiliently opposing pivotal movements of said bearing element, guide means connecting said bearing element with said wheel carrier so as to allow for a vertical movement of the latter relative to the chassis, a spring block mounted on the outer end of said transverse member, and spring means between said spring block and guide means to resiliently absorb the up and down movements of the wheel carrier.

7. In a wheeled vehicle, a combination, as claimed in claim 6, in which said guide means for the wheel carrier, comprises two guide links disposed above one another substantially in the vertical center plane of said transverse member, the upper guide link connecting said wheel carrier with the upper end of said bearing element above said transverse member, and the lower guide link connecting said wheel carrier with the lower end of said bearing element below said transverse member, said wheel carrier forming with said upper and lower links a guide link parallelogram permitting up and down movements of the wheel carrier relative to the chassis, said spring means comprising a helical spring disposed within said guide link parallelogram, while the intersection of said longitudinal and transverse members is disposed outside of said parallelogram.

8. In a wheeled vehicle, a chassis comprising a longitudinal member, a transverse member intersecting said longitudinal member, a pin-shaped bearing element passing substantially vertically through said transverse member at one side of the intersection and being supported in said transverse member for pivotal movements about a substantially vertical axis, a wheel carrier, guide means connecting said wheel carrier with said bearing element so as to allow for vertical movements of the wheel carrier relative to the chassis, and means resiliently opposing pivotal movements of said bearing element about said vertical axis, said last mentioned means including an elastic element carried by said transverse member on the other side of the intersection.

9. In a wheeled vehicle, as claimed in claim 1, an abutment element carried by and upwardly projecting from said lower spring block to limit the upward movement of the wheel carrier relative to the chassis by cooperation with said upper spring block, and an abutment on the upper guide link to limit the downward movement of said wheel carrier relative to the chassis by cooperation with said upper spring block.

10. In a vehicle, a chassis, a wheel, a wheel carrier, two guide links disposed above one another and connecting said wheel carrier with the chassis, a spring block immovably mounted on the outside of said chassis between said guide links, an unguided helical spring compressively mounted between said spring block and one of said guide links to cushion the wheel relative to the chassis, said upper guide link having an abutment over said spring block, said link and abutment being freely supported with respect to said spring block, said spring block being arranged to serve as an abutment limiting the upward stroke of the lower guide link and the downward stroke of the upper guide link.

11. In a vehicle, a combination as claimed in claim 10, in which said helical spring is disposed between said spring block and the lower guide link, an abutment element being disposed between said lower guide link and said spring block within said helical spring, and a second abutment element between the upper guide link and the spring block, said abutment elements being arranged to have their contact points substantially in the axis of said helical spring.

12. In a vehicle, a combination as claimed in claim 10, comprising a second spring block mounted pivotally on the lower guide link, said helical spring being disposed between said two spring blocks, an abutment element carried by said second spring block and projecting upwardly therefrom within said helical spring to limit the upward movements of the wheel relative to the chassis by cooperation with said first spring block, the abutment on the upper guide link limiting the downward movement of said wheel relative to the chassis by cooperation with said first spring block, the contact points between both said abutments and said first spring block being disposed substantially axially of said helical spring.

13. In a vehicle, a combination as claimed in claim 10, in which the two abutment faces of the spring block are disposed on opposite sides of the spring block substantially centrally thereof.

14. In a vehicle, a combination as claimed in claim 10, comprising elastic members arranged on opposite sides of said spring block substantially centrally thereof to cause noiseless stroke limiting cooperation between said spring block and said upper and lower guide links.

15. In a wheeled vehicle, a chassis including longitudinal members and transverse tubular members intersecting said longitudinal members and extending beyond the latter at a common level, a bracket reinforcing the transverse tubular member and providing, at the end of the extension, one seat for a resilient member, a supporting system for a road wheel and connected with the transverse member outwardly of the intersection in a manner to provide for up and down motion of the wheel, said supporting system including a second seat for a resilient member, a resilient member between the seats and cushioning the wheel system motion, said bracket having reinforcing sides providing a housing for said resilient member, a lever projecting from said supporting system inwardly past said intersection, said lever being connected with said supporting system to transmit shocks acting on the wheel in a plane substantially parallel to the chassis, and means on the transverse member inwardly of the intersection to absorb the shocks transmitted by said lever.

16. In a wheeled vehicle, a chassis comprising a longitudinal member, a transverse member intersecting said longitudinal member and projecting outwardly beyond the latter, a wheel carrier, a bearing element carried on said transverse member outwardly of said intersection for pivotal movement about a vertical axis, guide means connecting said bearing element with said wheel carrier so as to allow for vertical movements of the latter relative to the chassis, buffer means mounted on said transverse member inwardly of said intersection, and at least one arm rigid with said bearing element and contacting said buffer means to resiliently oppose pivotal movements of said bearing element about said vertical axis.

17. In a wheeled vehicle, a combination, as claimed in claim 16, in which said bearing element is formed as a vertical pivot pin, said arm being rigid with the lower end of said pivot pin and projecting below said transverse member to a point inwardly of said intersection, the inner end of said arm being supported against said buffer means.

18. In a wheeled vehicle, a chassis comprising a longitudinal member, a transverse member, a pin-shaped bearing element passing through said transverse member in one side of said longitudinal member and being supported for pivotal movements about a substantially vertical axis, a wheel carrier, guide means connecting said wheel carrier with said bearing element so as to allow for vertical movements of the wheel carrier relative to the chassis, means resiliently opposing pivotal movements of said bearing element about said vertical axis and including a part disposed on the side of said transverse member opposite that carrying said bearing element, a spring block disposed on the end of said transverse member, and a helical spring between said spring block and guide means.

MAX WAGNER.